N. W. Beckwith.
Stove Pipe Closet.

Nº 90,486.  Patented May 25, 1869.

Witnesses.
J. M. Coombs
Fred Haynes

Inventor.
N. W. Beckwith

NELSON W. BECKWITH, OF McDONOUGH, NEW YORK.

Letters Patent No. 90,486, dated May 25, 1869.

---

HOT CLOSET FOR STOVE-PIPES.

---

The Schedule referred to in these Letters Patent and making part of the same.

---

*To all whom it may concern:*

Be it known that I, NELSON W. BECKWITH, of McDonough, in the county of Chenango, and State of New York, have invented a new and useful Hot Closet for Stove-Pipes, of which the following is a full, clear, and exact description, reference being had to the accompanying drawing, forming part of this specification, and in which—

Figure 1:
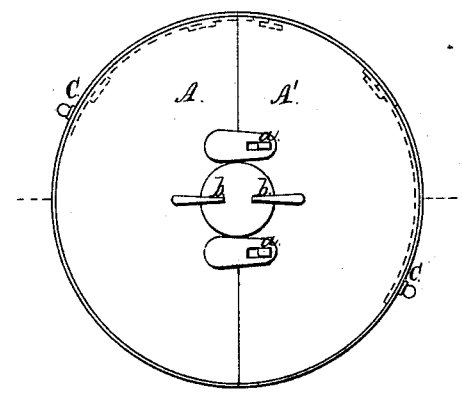

Figure 1 represents a plan of my invention, and

Figure 2:
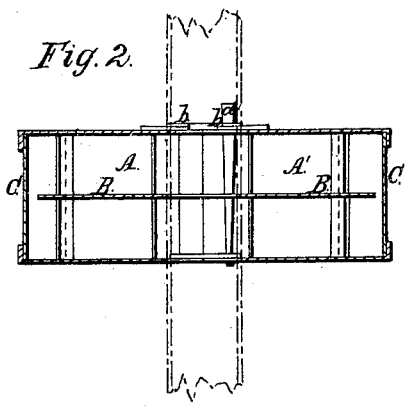

Figure 2 a vertical section of the closet, as applied to a stove-pipe.

Similar letters of reference indicate corresponding parts.

My invention consists in a hot closet formed in sections, and provided with clamping-devices for attachment to a stove-pipe, which is made to pass through it, and, by the heat radiating from the pipe, to impart warmth to the closet, which may be used for a variety of purposes, such as to heat dishes and plates with or without viands on them.

Referring to the accompanying drawing, the shell or outer case of the closet, which is here represented as of cylindrical form, but may be of any other suitable shape, is made in sections A A', to facilitate the arrangement of the closet around the stove-pipe at any desired point or elevation in the length of the pipe, after the latter has been erected, and to allow of its removal or adjustment when required.

To close the sections, and clamp the whole together, and to the pipe, and prevent the closet from slipping down the latter, the two sections A A' are drawn together by keys $a$ $a$, or other suitable fastenings, and prongs $b$ $b$ arranged to pierce the stove-pipe.

Such clamping-device or devices, however, may be varied.

A shelf or shelves, B, of which there may be any number, may be arranged within the closet, which should be provided with one or more doors, C, preferably of a sliding character.

A hot closet thus constructed and provided, may be attached to or removed from any stove-pipe in use, with facility and dispatch, and will be found of great convenience for various domestic purposes.

What I claim as my invention, and desire to secure by Letters Patent, is—

A hot closet constructed in sections, and provided with clamping-devices for attachment to a stove-pipe, substantially as herein described.

NELSON W. BECKWITH.

Witnesses:
 GILBERT BECKWITH
 ALBERT BECKWITH.